Aug. 4, 1936.    A. E. CARLISS    2,050,084
FLUID PRESSURE GAUGE
Filed July 14, 1932

INVENTOR.
Albert E. Carliss.
BY
ATTORNEY.

Patented Aug. 4, 1936

2,050,084

UNITED STATES PATENT OFFICE 2,050,084

FLUID PRESSURE GAUGE

Albert E. Carliss, New York, N. Y., assignor to Acme Air Appliance Company, Inc., Brooklyn, N. Y., a corporation of New York Application July 14, 1932, Serial No. 622,427

10 Claims. (Cl. 73—111)

This invention relates to fluid pressure gauges.

In a fluid pressure gauge constructed on the principle of having a graduated indicator bar moved outwardly of a cylinder by a plunger impelled against the tension of a helical, compression spring by the force of the fluid whose pressure is being read, the plunger and the spring being housed in the cylinder, the indicator bar should be stiff and rigid enough to withstand use and should be of such form that the markings or graduations thereon may be readable from substantially all points or angles of vision. Since the plunger is impelled by the fluid within the object whose pressure is to be determined, it is desirable to prevent a sudden inrush of fluid into the cylinder of the gauge which would otherwise tend to give a false indication. Also the free in-and-out movement of the indicator bar should be damped in order to give a smooth outward movement free from any erratic or jerking motion, and it is furthermore desirable to retain the indicator bar in the position in which it has been placed by the plunger after return of the plunger. Since the helical spring compresses as the plunger is being impelled, it is desirable to provide means for preventing against possible disruption or distortion of the spring.

The present invention embodies a gauge having the desirable and essential features above referred to, and constructed of simple form with a minimum number of parts, for the accomplishment of the desired results in practical operation.

In the drawing:—

Figure 1:
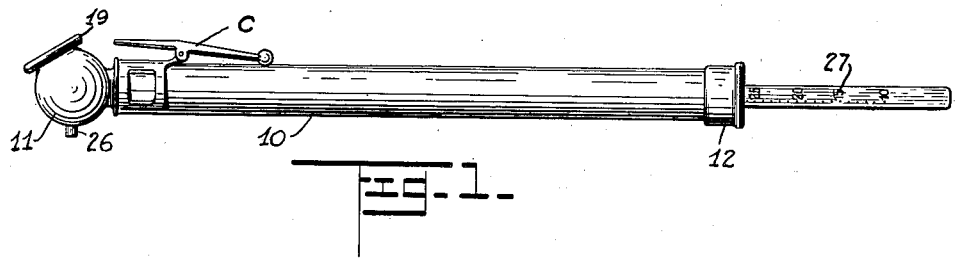
Figure 1 is a side elevation of the device.
Figure 2:
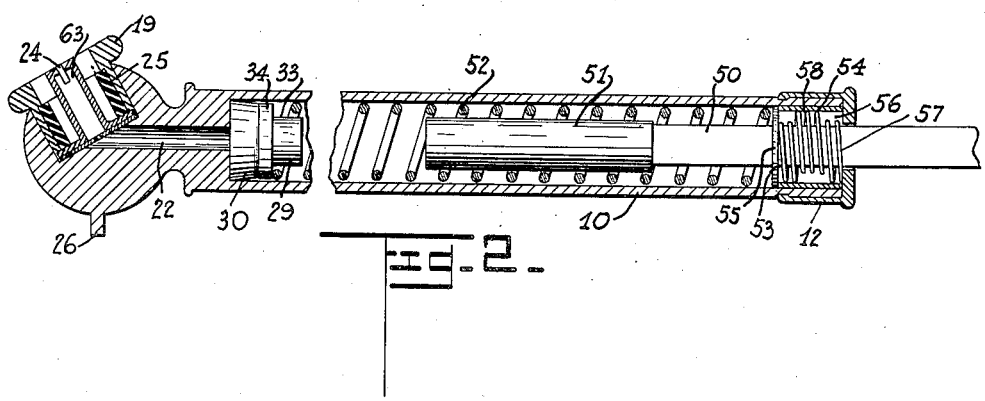
Figure 2 is a longitudinal sectional view of a gauge embodying the invention.

The construction of my gauge comprises a casing or housing 10, having mounted therein, the indicator bar 50 which is of polysided construction. The indicator bar 50 may be provided with indicia 27 on its various sides, whereby the pressures indicated by the bar may be readily determined.

A cap 12 closes the right hand end of the casing 10 and is suitably secured to the casing from displacement.

The indicator bar 50 has a large cylindrical end portion 51 which is of sufficient length, namely, longer than the length of the helical spring 52 surrounding the gauge bar 50, when said helical spring is completely compressed. In this manner the cylindrical portion 51 prevents distortion or disruption of the spring. One end of the compression spring 52 rests against the plunger 29, against which the pressure of air in a tire or the like is directly received, whereby to effect movement of the plunger 29 and corresponding pressure indicating movement of the bar 50. The other end of the spring 52 rests against a washer 53 having an opening therein of a shape corresponding with the shape of the triangular indicator bar 50. Washer 53 rests against a sleeve member 54 thereby creating a chamber 56. A helical spring 57 with its center coils offset at 58 is arranged in the chamber 56 and surrounds the bar 50 providing the tension and friction required to prevent undue free movement of the bar 50. It is understood that the cap 12 is provided with an opening corresponding with the cross sectional shape of the bar 50. While this cross section is preferably of triangular shape, it may be of any other suitable form, as for instance, square in cross section.

It will be observed from the foregoing, that the coil spring 57 may be characterized as having a plurality of helices each encompassing the indicator bar 50 and each in engagement therewith, so that each helix is located to have a portion engaging and resiliently stressed against the indicating bar 50 to frictionally keep the latter in its indicating position. The coil spring 57 being disposed in the chamber 56, the cap 12 and the washer 55 prevent bodily movement of the spring in a self evident manner.

The plunger 29 has a cup-shaped washer 30 fastened thereto. At 33 the plunger is reduced thereby forming a collar 34 against which the left end of the plunger 52 is seated. Air is admitted to the casing 10 to cooperate with the plunger 29 through the head 11 at the left end of the casing 10, the same equipped with a fluid inlet 24 connecting with the chamber 63 in communication with the air passage 22. A gasket 25 is fitted in the chamber, being seated against the inner end of the member providing the chamber 63, and the head has the flanged portion 19 and the projection 26, the latter to engage the check valve of a pneumatic tire in the well known manner to relieve the pressure.

Having thus described my invention, what I claim as new and desire to secure by Letters Patent, is:

1. A fluid pressure gauge having a casing, a deflating head associated with said casing, said casing having a fluid passage leading from said head to within said casing, an indicating member movable through said casing, pressure-actuated means for shifting the indicating member proportionally to the pressure supplied, means for resiliently resisting shifting of the indicating means by the pressure-actuated means for causing the shifting movement to be proportional to the pressure, and a coil spring having a plurality of helices encompassing said indicating member, part of said spring being in engagement with said member, and another part thereof being in engagement with said casing to frictionally retain said member in indicating position.

2. In pressure fluid gauges, the combination with a housing, of a gauge bar reciprocally mounted therein and extending therethrough, pressure actuated means for shifting the gauge bar, means for resiliently resisting such shifting of said bar for causing the shifting thereof to be proportional to the pressure exerted against said pressure actuating means, and a coiled spring having a plurality of helices each encompassing said gauge bar and each in engagement therewith, and each helix aforesaid being located to have a portion to engage and resiliently stress against the gauge bar to frictionally keep it in its indicating position, said gauge bar being angular in cross section to thus provide edges engaged by the helices of the spring, and parts preventing bodily movement of the coiled spring within the housing.

3. The combination as claimed in claim 2 wherein the spring is a coiled spring having one of its helices offset laterally relative to another so that one engages one side of the bar while the other engages the opposite side of the bar under resilient tension.

4. The combination as claimed in claim 2 wherein the spring is a coiled spring having one of its helices offset laterally relative to another so that one engages one side of the bar while the other engages the opposite side of the bar, the helices being tensioned to stress laterally away from that approach toward axial alinement maintained by the presence of the bar and thereby frictionally engaging the bar.

5. The combination as claimed in claim 2 wherein the spring is a coiled spring having one helix offset laterally relative to another sufficiently to require the helices to be brought toward coincidence of their longitudinal axes to enable the insertion of the gauge bar whereby said helices are under spring tension relative to each other laterally of the bar to grip the bar frictionally, the spring being located to have its ends engaged by portions of the housing for preventing longitudinal movement thereof.

6. In fluid pressure gauges, the combination, with a housing, of a gauge bar reciprocally mounted in and movable through the housing, a plunger for actuating the gauge bar under a pressure impulse, and a coiled spring surrounding the gauge bar and engaging the plunger for resisting such impulse, the gauge bar being formed with an enlarged, cylindrical inner terminal portion proportioned to have the outer end of said cylindrical portion outstand from the bar sufficiently to underlie a portion of the housing and prevent escape of the bar from the housing, the said cylindrical portion being of a length as great or greater than the length of that portion of the coiled spring outward beyond the plunger when fully collapsed.

7. In pressure fluid gauges, the combination of a housing, a gauge bar reciprocally mounted therein, and a spring held on said casing coiled about the bar with a plurality of helices, one of said helices being set in such relation to another and the diameters of the helices being such as to cause a part of one helix to frictionally engage the bar under spring tension at one place and a relatively opposite part of another helix at the other side of the bar to engage the bar frictionally under spring tension stressing in the opposite direction from the direction of stress of the first helix.

8. The combination as claimed in claim 7 wherein a plurality of helices of the spring are offset laterally relative to other helices thereof so that the longitudinal axis of the coil of the first set of helices does not register normally with the axis of the other helices and the coils are sprung in a direction toward such registration in being applied to the bar.

9. The combination as claimed in claim 7 wherein the bar is provided with longitudinal edges engaged by the respective helices.

10. A fluid pressure gauge comprising a casing having a head adapted to be connected with a source of fluid pressure, a plunger in said casing adapted to be actuated in one direction by the fluid thus supplied, a spiral spring adapted to be compressed when said plunger is moved in said direction and adapted to return the said plunger to its initial position when the gauge is disengaged from the fluid source, an indicating member projecting within said spring and adapted to be moved through said casing by said plunger to indicating position, and a coiled spring having a plurality of helices each encompassing said indicating member and each in engagement therewith, each helix being located to have a portion engaging and resiliently stressed against the indicating member to frictionally keep it in said indicating position, the coiled spring being disposed in the casing, and parts preventing bodily movement of the coiled spring in the casing.

ALBERT E. CARLISS.